C. A. HANSER & C. M. VAN DER KLOOSTER.
CRANE WITH HYDRAULIC WEIGHING DEVICE.
APPLICATION FILED MAY 24, 1917.

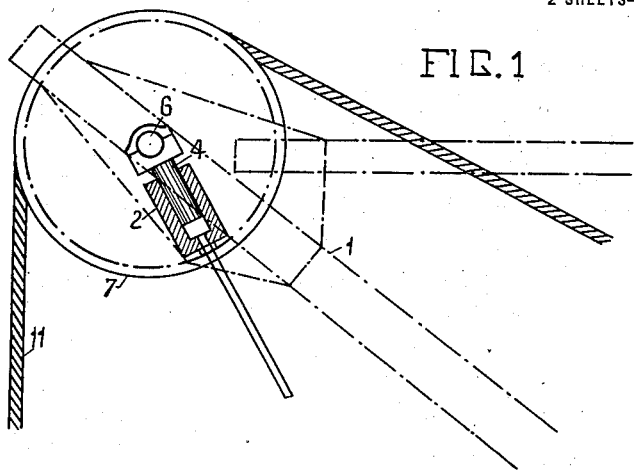

1,266,587.

Patented May 21, 1918.
2 SHEETS—SHEET 2.

INVENTORS:
C. A. HANSER
C. M. VAN DER KLOOSTER
BY: H. van Oldenmeel
ATTORNEY.

UNITED STATES PATENT OFFICE.

CHARLES ALFRED HANSER AND CORNELIS MARINUS VAN DER KLOOSTER, OF ROTTERDAM, NETHERLANDS.

CRANE WITH HYDRAULIC WEIGHING DEVICE.

1,266,587.  Specification of Letters Patent.  Patented May 21, 1918.

Application filed May 24, 1917. Serial No. 170,797.

*To all whom it may concern:*

Be it known that we, CHARLES ALFRED HANSER, a subject of the King of Great Britain and Ireland, and CORNELIS MARINUS VAN DER KLOOSTER, a subject of the Queen of the Netherlands, both residing at Rotterdam, Netherlands, have invented a new and useful Crane with Hydraulic Weighing Device, of which the following is a specification.

Our invention relates to a crane with a hydraulic weighing device in which the shaft on which the pulleys are arranged is mounted hydraulically at both ends. By this arrangement, the force exerted on the pulley shaft is directly measured and any friction which might affect the result of the weighing is completely avoided.

Moreover, any slight lowering in consequence of the load on the plungers which carry the pulley shaft will produce practically no alteration in the fluid pressure—a feature of great importance for exact weighing.

Moreover, the hydraulic connection for the plungers on the one end of the pulley shaft are preferably completely separate from those for the plunger on the other end of the pulley shaft so as to take care of any inclination of the pulley shaft due to accidental one sided loading.

For the purpose of arranging the pulley shaft for the weighing in an exactly vertical position there are arranged above this shaft two projections against which the shaft on rising abuts. It may happen that by the pressure in the conductors strains in the material of the tubes and other parts would take place which pressure would give too great a result in the weighing operation, and such must naturally be prevented. For this purpose there is arranged in each of the hydraulic devices an outlet device consisting of a cylinder in which a plunger is pressed upward by a spring, the space above the plunger being connectible by means of a three-way cock either with the hydraulic main pipe or with the liquid container so as to allow a small quantity of liquid to pass off for balancing.

To permit of easy reading of the sum of the pressure produced in both mains or of the weight of the load corresponding to this sum, there is employed a manometer having two springs each connected with one of the hydraulic mains or conduits, the one spring being connected with the pointer and the other spring with the dial, the pointer and dial being adapted to rotate in opposite directions on the measuring instrument being loaded.

In lieu of the already mentioned manometer there may be used an arrangement consisting of two cylinders each connected with one of the mains or conduits and fitted with plungers connected with one another, the sum of the pressures produced on the plunger being adapted to be measured by means of a scale.

Obviously, one or more pumps are provided for maintaining the pressure in the hydraulic device, these pumps being fitted with a safety valve to prevent too great a rise in pressure.

A particular advantage of the arrangement is that it may be fitted to practically any existing crane without the necessity of considerable alterations of the crane for the purpose.

Within the scope of the invention comes a crane the hydraulic weighing in which is not indirectly but directly effected say by the arrangement of one or more hydraulic cylinders with plungers in one of the ties or struts, since increases in pressure or tension are produced in these members when the load is increased. It is thus obvious that in these cases the different members of the crane must be arranged in the same manner as in known cranes with a jib movable in a vertical plane.

Referring to the drawings, which form part of this specification:

Figure 1 is a side view of the head of the crane arm.

Fig. 2 is a diagrammatic illustration of the plungers, pipes or conduits and valves necessary for the operation of the weighing device.

Figure 3:
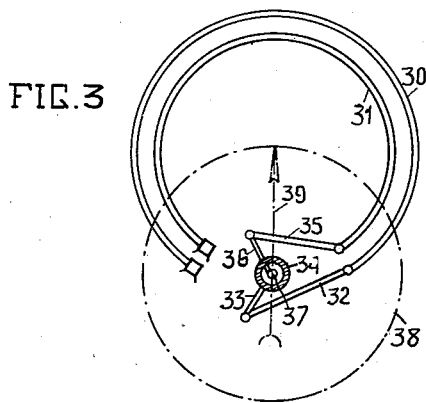
Fig. 3 is a front view of part of the manometer.

As shown, on the crane arm 1 are arranged cylinders 2 and 3 with plungers 4 and 5 adapted to move therein. These plungers support a pulley shaft 6 on which are arranged pulleys 7, 8, 9 and 10 over which passes a cable, rope or the like 11.

The cylinder 2 is connected by means of a main 12 with a pump 13 which can be driven by hand, by a windlass or from a separate motor. This pump 13 serves to draw the operating liquid such as water, glycerin or oil from a container 15 through a pipe 14. The connection between the pump 13 and the container 15 can be closed by a non-return valve 16. Behind the pump 13 is arranged a safety valve 17 which is pressed against its seat by means of a helical spring 18 and which can be adjusted by a screw 19. A pipe 20 connects the space above the safety valve 17 with the container 15. There is provided in the main or conduits a non-return valve 53.

The main 12 is connected by means of pipes 21 with a three-way cock 22 which, in the position shown, connects the pipe 21 with a cylinder 23, rotation of the cock 22 to bring the handle 24 into the position shown in dotted lines connecting the cylinder 23 and a main 25 leading to the container 15. In the cylinder 23 is provided a plunger 26 beneath which is arranged a helical spring 27.

Moreover, the main 12 is connected by means of a pipe 28 with a manometer 29. The cylinder 3 has a system of piping with apparatus associated therewith identical with that of the cylinder 8.

Figure 4:
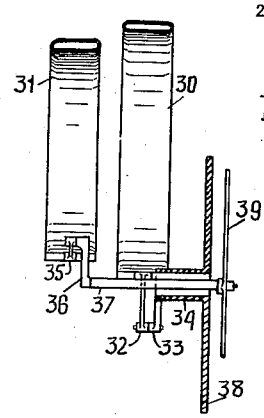
Fig. 4 is a section through the same.

The manometer 29 (see Figs. 3 and 4) is fitted with two springs 30 and 31. Spring 30 is connected by means of a link 32 and a lever 33 with a sleeve 34, while spring 31 is connected by means of a link 35 and a lever 36 with a small shaft 37. To the sleeve 34 is fitted a dial 38, while to the shaft 37 is connected a pointer 39. On loading the spring 30 the dial 38 is rotated toward the left, while on loading the spring 31 the pointer 39 is rotated toward the right. Thus, on the scale the sum of the two loads (that on the spring 30 and that on the spring 31) can be measured directly. The pipe 28 (see Fig. 2) is connected with the spring 30 while pipe 40 is connected with the spring 31.

Figure 5:
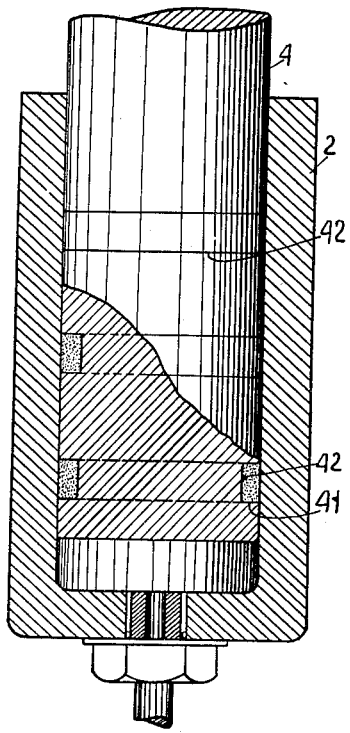
Fig. 5 is a section through the cylinders and plungers.

The cylinder 2 and plunger 4 are shown to enlarged scale in Fig. 5. In the plunger 4 are turned grooves 41 in which are fitted leather piston rings 42; thus complete tightness is obtained while friction is reduced to a minimum. The other plungers are arranged in the same manner.

Figure 6:
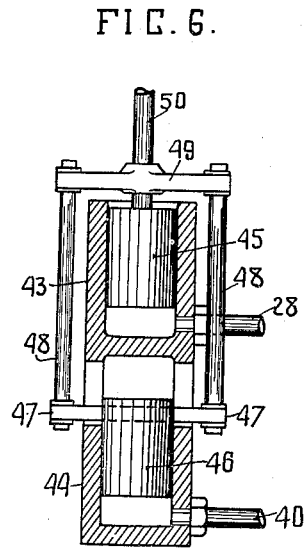
Fig. 6 is a device for determining the sum of the pressures in both mains or conduits.

In Fig. 6 is shown a device with which the pressure produced in the pipes 28 and 40 may be measured, and which can thus be used in lieu of the manometer 29. This device consists of two cylinders 43 and 44 with plungers 45 and 46 adapted to move therein. The plunger 46 is connected by means of arms 47, rods 48 and a yoke 49 with the plunger 45. To the plunger 45 and with the yoke 49 is connected a rod 50 on which pressure is exerted, the amount of which pressure denotes the sum of the pressures existing in the pipes 28 and 40. This total pressure can thus be measured on the rod 50 say either with a weighing machine or by means of a spring arrangement or in any suitable manner.

The weighing device is used in the following manner:

When a ship is to be discharged or other work is to be commenced the pumps 13 are set in operation to pump the liquid out of the container 15 and into the mains 12. As soon as the plungers 4 and 5 abut against the projections 51 and 52, the pressure in the mains 12 will rise. When the pressure has reached a determined amount the safety valves 17 come into operation and the excess liquid flows back through the pipes 20 to the container 15. It is clear that the maximum pressure can be regulated by means of the helical spring 18 and screw 19.

Now, the load is suspended on the cable 11 and the latter raised to a predetermined height. This may suitably be done by marking the cable or winch so that when the mark reaches a certain position it will indicate that the desired height has been attained. It is obviously desirable that each weighing operation should take place with the load at a predetermined height as the same length of cable 11 will then always be weighed with the cable and thus no difference in the results due to the weighing of more or less cable can occur.

When the load has reached the desired height, the three-way cocks 22 are moved into the position shown, and a small quantity of liquid will flow into the cylinders 23, the plungers 26 will thereby be moved downward and the helical spring 27 will be slightly compressed. Then the three-way cocks are moved until the handles 24 occupy the position 24' shown in dotted lines, communication between the pipes 21 and cylinders 23 being thereby interrupted and the liquid forced out of the cylinders 23 by the pressure of the springs 27 through the now open connections between the said cylinders and the pipes 25 to the containers 15. This reduction in the quantity of liquid in the main is desirable as otherwise the pressure on the liquid which pressure is to be measured later would be affected by strain on the material which would lead to less exact results. Now, the weight of the load which is suspended from the cable can be directly read off on the manometer (see Figs. 3 and 4) as the division of the scale is so arranged as to take account of the weight of the pulley shaft with pulleys, the cable and hooks. If the apparatus shown in Fig. 6 is employed the divisions on the scale of the pressure measuring apparatus can be arranged in the same manner as in a manometer.

It is desirable to keep the system of piping for the cylinder 2 completely separate from that of the cylinder 3 as otherwise with an accidental one sided loading of the pulley shaft this shaft might assume an inclined position which would lead to less exact weighing results.

We claim:

1. A crane having hydraulically operating weighing means and including a pulley shaft, a cylinder disposed adjacent one end of said shaft, a plunger within said cylinder and connected to said shaft, a hydraulic connection whereby to impart movement to said plunger, a cylinder disposed adjacent the opposite end of said shaft, a plunger within said cylinder and connected to said shaft, a hydraulic connection whereby to impart movement to said last mentioned plunger, said last mentioned hydraulic connection being separate from said first mentioned hydraulic connection, and means for controlling the amount of movement of the pulley shaft, substantially as and for the purpose set forth.

2. A crane having hydraulically operating weighing means and including a pulley shaft, a cylinder disposed adjacent one end of said shaft, a plunger within said cylinder and connected with said shaft, a hydraulic connection whereby to impart movement to said plunger, a cylinder disposed adjacent the opposite end of said shaft, a plunger within said cylinder and connected to said shaft, a hydraulic connection whereby to impart movement to said last mentioned plunger, said last mentioned hydraulic connection being separate from said first mentioned hydraulic connection, liquid withdrawing means fitted to each of said hydraulic connections, said liquid withdrawing means including a cylinder, a plunger within said cylinder, a spring supporting said plunger, and a connection with said cylinder above said plunger for allowing escape of liquid from said cylinder, substantially as and for the purpose set forth.

3. A crane having hydraulically operating weighing means and including a pulley shaft, a cylinder disposed adjacent one end of said shaft, a plunger within said cylinder and connected to said shaft, a hydraulic connection whereby to impart movement to said plunger, a cylinder disposed adjacent the opposite end of said shaft, a plunger within said cylinder and connected to said shaft, a hydraulic connection whereby to impart movement to said last mentioned plunger, said last mentioned hydraulic connection being separate from said first mentioned hydraulic connection, and a manometer connected with said hydraulic connection, said manometer fitted with a dial and a pointer, and having a pair of springs, said springs being each connected with one hydraulic connection, one of said springs being connected with said pointer and the other of said springs with said dial, substantially as and for the purpose set forth.

In testimony whereof we affix our signatures in presence of two witnesses.

CHARLES ALFRED HANSER.
CORNELIS MARINUS van der KLOOSTER.

Witnesses:
J. M. N. DOLLE,
M. H. WINENENLY.